United States Patent [19]

Schmidt

[11] 4,285,667

[45] Aug. 25, 1981

[54] RECEIVER FOR SOLAR POWER STATIONS

[75] Inventor: Guenther Schmidt, Taufkirchen, Fed. Rep. of Germany

[73] Assignee: Messerschmitt-Boelkow-Blohm Gesellschaft mit beschraenkter Haftung, Munich, Fed. Rep. of Germany

[21] Appl. No.: 26,181

[22] Filed: Apr. 2, 1979

[30] Foreign Application Priority Data

Apr. 20, 1978 [DE] Fed. Rep. of Germany ....... 2817166

[51] Int. Cl.³ ............................................. F24J 3/02
[52] U.S. Cl. ................................................. 126/438
[58] Field of Search ............... 126/438, 448, 440, 443, 126/439

[56] References Cited

U.S. PATENT DOCUMENTS

| | | | |
|---|---|---|---|
| 3,934,573 | 1/1976 | Dandini | 126/440 |
| 3,998,206 | 12/1976 | Jahn | 126/438 |
| 4,043,315 | 8/1977 | Cooper | 126/438 |
| 4,048,982 | 9/1977 | Pei | 126/438 |
| 4,171,876 | 10/1979 | Wood | 126/438 |

FOREIGN PATENT DOCUMENTS 824726 11/1937 France ..................................... 126/438

Primary Examiner—Carroll B. Dority, Jr.
Attorney, Agent, or Firm—W. G. Fasse; D. F. Gould

[57] ABSTRACT

A receiver for solar power stations comprises a plurality of parabolic mirrors combined with spherical collectors located substantially in the focal point of each mirror. These spherical collectors form absorbers which may be connected in series and/or in parallel with each other.

11 Claims, 5 Drawing Figures

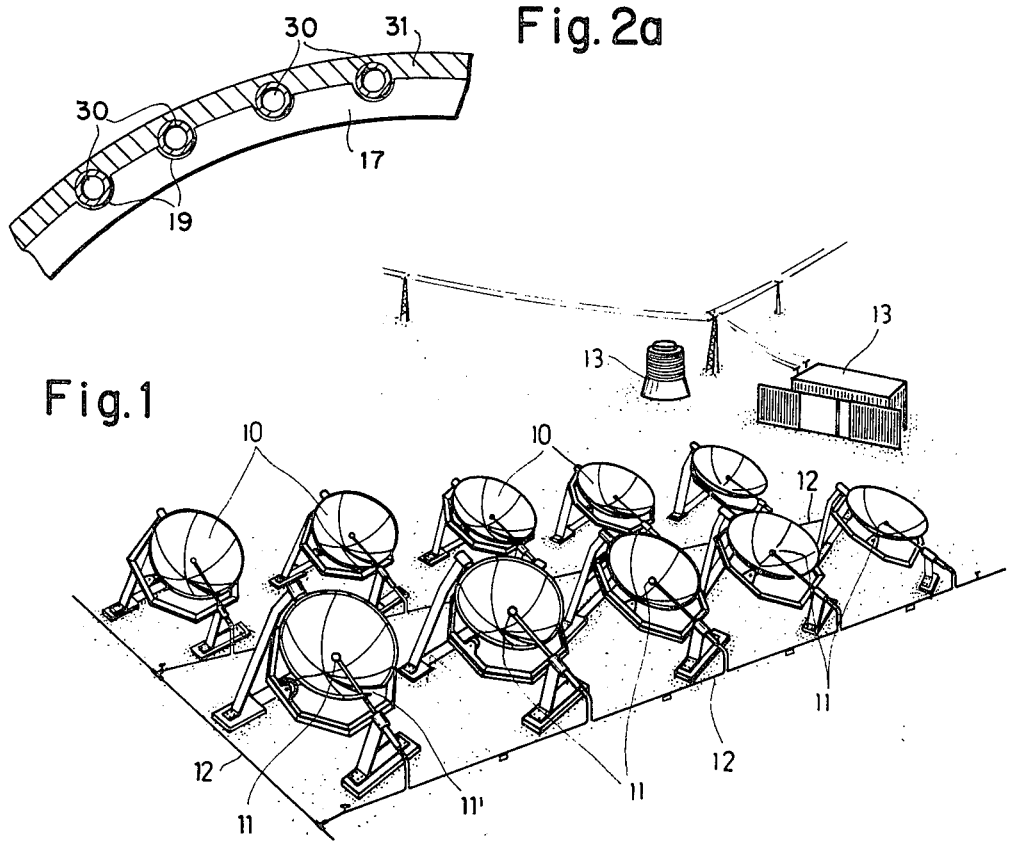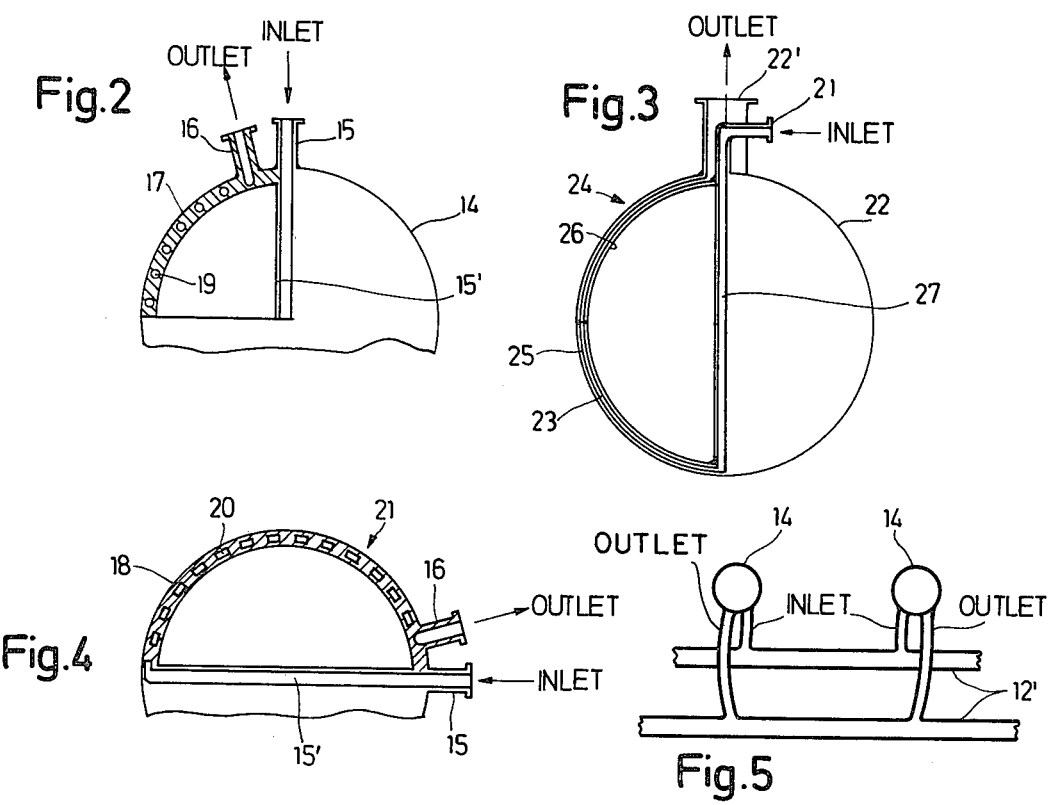

RECEIVER FOR SOLAR POWER STATIONS

BACKGROUND OF THE INVENTION:

The present invention relates to receivers for solar power stations wherein the sunlight is concentrated in the manner of the so-called solar farm principle.

Solar receivers of the just mentioned type are known. Such receivers collect the sunlight in a point type zone or the heat is concentrated in such zone for transferring the heat to a liquid or gaseous heat transport medium. A plurality of collectors of this type feeds the heated medium into a common piping network which in turn is connected to a circulatory system including work performing machines. The collectors are moved to follow the instantaneous position of the sun. However, it is also known to construct the collectors in such a manner that at least within a certain range a movement following the sun is not required.

The use of concentrating receivers or collectors is suitable if the working temperature range is above 150° C. However, such concentrating receivers make it necessary not to utilize the indirect sunlight.

It is necessary that the direct radiation energy must be transmitted to the heated transport medium with a minimum of thermal losses. In addition it is necessary that pressure losses in the heat transport medium are maintained as low as possible when the heat transport medium travels through the absorber in order to keep the energy necessary for the circulation of the heat transport medium as low as possible. Another problem encountered in this context resides in the fact that some of the suitable heat transport media are sensitive against overheating which limits the upper inner wall temperature of the receiver.

OBJECTS OF THE INVENTION:

In view of the above it is the aim of the invention to achieve the following objects singly or in combination:

to construct a receiver which will meet the above mentioned requirements and which in addition will be substantially maintenance free;

to construct a solar energy receiver so that it will be substantially insensitive relative to thermal stress, yet relatively inexpensive in its manufacture; and to construct the parabolic mirror and receiver unit in such a manner that the mirrors may be moved to follow the course of the sun while keeping the corresponding spherical receiver component stationary in the focal point of the collecting mirror or substantially in the focal point.

SUMMARY OF THE INVENTION:

According to the invention there is provided a receiver for solar power stations wherein the sun energy is concentrated in accordance with the so-called solar farm principle wherein a plurality of hollow mirrors are arranged to form a field and wherein each mirror cooperates with a spherical ball absorber arranged in the focal point of each mirror to receive the energy in a zone or layer forming its outer surface.

The advantages of the invention are seen in that a small pressure drop is achieved in the receiver when the heat transport medium flows through the receiver while simultaneously providing a small temperature difference between the medium and the wall of the receiver. Further, the dead mass of the absorber is very small so that a small inherent inertia results. The symmetrical construction and the small masses have the advantage that thermal stresses are minimized which in turn results in a substantially prolonged useful life of these receivers according to the invention.

BRIEF FIGURE DESCRIPTION:

In order that the invention may be clearly understood, it will now be described, by way of example, with reference to the accompanying drawings, wherein:

FIG. 1 illustrates a perspective view of a so-called solar farm wherein the collector mirrors are equipped with spherical receivers according to the invention;

FIG. 2 is a partial sectional view through a spherical receiver or collector according to the invention;

FIG. 2a is a detailed sectional view of the surface wall means and cover layer of the spherical absorber of FIG. 2.

FIG. 3 is a view partially in section of another receiver embodiment according to the invention;

FIG. 4 is a partial sectional view of a still further embodiment of a spherical receiver; and FIG. 5 is a pipe diagram connecting the several collector mirrors and receivers in parallel.

DETAILED DESCRIPTION OF PREFERRED EXAMPLE EMBODIMENTS AND OF THE BEST MODE OF THE INVENTION:

FIG. 1 shows a so-called solar farm or rather, one field of such a farm comprising, for example, ten hollow mirrors 10 operatively connected to a power station 13 by a pipe system 12 which in the illustration connects the mirror and spherical absorber units in series. Each such unit includes a spherical heat absorber 11 located in the focal point of the respective mirror 10. A liquid or gaseous heat transport medium flows through the pipe system 12 and through the mirror absorber units as will be described in more detail below. The mirrors 10 are movable to follow the course of the sun as is well known in the art. In order to keep the absorber spheres 11 stationary, each mirror 10 is provided with a sector slot 11'. Keeping the absorber spheres stationary greatly simplifies the piping and connecting system for the heat transport medium.

The spherical ball absorbers 11 are constructed with due regard to the type of the heat transport medium. Different configurations may be employed for different media.

FIG. 2 and 2a illustrates an embodiment of a collector sphere 14 suitable for liquid heat transport media, in which the mirror facing surface 17 of the sphere is provided with spirally arranged grooves 19 into which there are inserted respective spirally shaped pipe sections or tubular members 30 which are then covered by a galvanically deposited coating 31. The sphere 14 is provided with an inlet port or flange 15 leading into a channel 15' connected to one end of the spiral tubing in the grooves 19. The other end of the tubing leads into an outlet port or flange 16. These inlet and outlet ports 15, 16 are connected to the piping system 12 in series fashion as shown in FIG. 1 or in parallel fashion as shown in FIG. 5. In FIG. 5 two parallel pipes 12' perform substantially the same function as the pipes 12 in FIG. 1, namely, to circulate the heat transporting medium in a closed circuit system from the absorbers 11 to working machines in the power station 13 and back.

FIG. 4 illustrates an embodiment in which the flow channels 20 form an integral part of the surface zone 18 of the spherical collector member 21. The channels 20 may be machined into the surface zone of a spherical component whereby these channels form an integral part of the spherical component surface which is then covered by a galvanically deposited outer skin. In FIG. 4 the inlet 15 is again connected through a channel 15' to one end of the heat absorber flow channels 20, the opposite end of which is connected to the outlet port 16. The channels 20 may also be formed by winding channel forming wall components onto the surface of the spherical component and securing the channel forming walls, for example, by adhesive, whereby again the radially outer surface would be covered by an outer heat absorbing skin which, as in FIG. 2, may be deposited by galvanical well known deposition techniques. In other words, the channels 20 form a system or arrangement of distributed or winding ducts over the surface of the spherical absorber for circulation of a heat transport medium throughout the surface area.

The spirally wound tubular member 30 in the spiral grooves 19, FIG. 2a, and the channel components 20 in FIG. 4 may be of copper or a suitable copper alloy, whereby the tubular member may be wound into a preformed groove in the surface zone 18 of the spherical component whereupon the so prepared unit is galvanized. By machining the channels 20 into a copper or other surface of a material which conducts heat well, it is possible to increase the spacing between the channels thereby reducing the total length of the channels which has the advantage that pressure losses are also reduced to a larger extent than is possible in embodiments made of steel, nickle, or the like.

The embodiment shown in FIGS. 2 and 4 are both suitable for use in a circulatory system employing a liquid heat transport medium because the flow speeds which are required for the heat transfer call for very small flow cross sectional areas. In any event, in both embodiments of FIGS. 2 and 4 a subsequent galvanization of the spiral pipe surface or of the channel surface is contemplated.

FIG. 3 illustrates an embodiment particularly suitable for boiling media which may be handled with lower flow speeds than are necessary for liquids. Thus, larger cross sectional flow areas may be employed as shown in FIG. 3, wherein the sphere 22 has a mirror facing side 24 provided with a flow gap 23 having substantially the shape of a hemisphere enclosed between an outer hemispherical wall 25 and an inner hemispherical wall 26. A channel 27 connects the inlet port 21 to the flow gap 23, the other end of which is operatively connected to the outlet port 22'. The embodiment of FIG. 3 may be produced by well known manufacturing steps such as stamping, pressing and welding. The boiling medium flowing out of the exit port 22' may be supplied into the circulartory system 12 or 12' as described. Depending on the temperature of the heat transport medium, the mirrors 10 and the respective spherical heat absorbers may be connected in series or in parallel or in a mixed type circulatory system, whereby the flow-in temperatures as well as the flow-out temperatures relative to the spherical absorber will also be taken into account.

Although the invention has been described with reference to specific example embodiments, it will be appreciated, that it is intended to cover all modifications and equivalents within the scope of the appended claims.

What is claimed is:

1. A receiver for solar power stations, comprising hollow mirror means each having a respective focal point, spherical absorber means operatively positioned substantially in the respective focal point, said spherical absorber means comprising spherical or hemispherical body means having respective surface wall means, distributed circulatory duct means operatively forming part of said surface wall means, and galvanically deposited cover layer means formed over said surface wall means and duct means, said spherical absorber means being irradiated on the outside thereof by sunlight concentrated by the hollow mirror means.

2. The receiver of claim 1, wherein said spherical absorber surface wall means comprises spirally shaped duct means operatively forming part of said surface wall means.

3. The receiver of claim 1, wherein said duct means are formed as an integral component of said surface.

4. The receiver of claim 1, wherein said duct means are wound onto said surface.

5. A receiver for solar power stations, comprising hollow mirror means each having a respective focal length, spherical absorber means operatively positioned substantially in the respective focal point, said spherical absorber means comprising inner hemispherical wall means having a winding groove preformed therein, and distributed duct means comprising tubular channel means wound into the groove preformed in said hemispherical wall means.

6. The receiver of claim 1 or claim 5, further comprising circulatory piping means for circulating a heat transport means therethrough, said mirror means and spherical absorber means forming units operatively connected to said piping means in parallel fashion.

7. The receiver of claim 1 or claim 5, further comprising circulatory piping means for circulating a heat transport means therethrough, said mirror means and spherical absorber means forming units operatively connected to said piping means in series fashion.

8. The receiver of claim 1 or claim 5, further comprising circulatory piping means for circulating a heat transport means therethrough, said mirror means and spherical absorber means forming units operatively connected to said piping means in mixed parallel and series fashion.

9. The receiver of claim 1 or claim 5, wherein said spherical absorber means comprise inlet port means and outlet port means for a heat transport medium, said inlet and outlet port means being arranged on a side of said spherical absorber means facing away from said hollow mirror means.

10. A receiver for solar power stations, comprising hollow mirror means each having a respective focal length, spherical absorber means operatively positioned substantially in the respective focal point, said spherical absorber means comprising spherical or hemispherical body means having respective surface wall means, distributed circulatory duct means operatively forming part of said surface wall means, said surface wall means of said spherical absorber means comprising a preformed winding groove and said distributed duct means comprising tubular channel means wound into said groove distributed over the surface wall means, and cover layer means formed over said surface wall means and duct means, said spherical absorber means being irradiated on the outside thereof by sunlight concentrated by the hollow mirror means.

11. The receiver of claim 10, wherein said cover means comprises a galvanically deposited cover layer formed over said surface wall means and distributed duct means.

* * * * *